(12) United States Patent
Zhang et al.

(10) Patent No.: US 9,069,195 B2
(45) Date of Patent: Jun. 30, 2015

(54) LIQUID CRYSTAL DISPLAY PANEL COMPRISING CONDUCTIVE STRUCTURE AND LIQUID CRYSTAL DISPLAY DEVICE

(71) Applicant: BOE TECHNOLOGY GROUP CO., LTD., Beijing (CN)

(72) Inventors: Peilin Zhang, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 266 days.

(21) Appl. No.: 13/704,794

(22) PCT Filed: Oct. 10, 2012

(86) PCT No.: PCT/CN2012/082707
§ 371 (c)(1),
(2) Date: Dec. 17, 2012

(87) PCT Pub. No.: WO2013/067875
PCT Pub. Date: May 16, 2013

(65) Prior Publication Data
US 2014/0085554 A1    Mar. 27, 2014

(30) Foreign Application Priority Data

Nov. 11, 2011   (CN) ...................... 2011 2 0447317 U

(51) Int. Cl.
*G02F 1/1345* (2006.01)
*G02F 1/133* (2006.01)
(Continued)

(52) U.S. Cl.
CPC ...... *G02F 1/13306* (2013.01); *G02F 1/136286* (2013.01); *G02F 2001/136272* (2013.01); *G09G 3/3614* (2013.01); *G09G 3/3696* (2013.01);
(Continued)

(58) Field of Classification Search
USPC ..................... 349/33, 149, 153, 156
See application file for complete search history.

(56) References Cited

U.S. PATENT DOCUMENTS 5,966,194 A * 10/1999 Hu et al. ................ 349/153
6,466,294 B1 * 10/2002 Yamagishi et al. .......... 349/155
8,368,864 B2 * 2/2013 Nagami ................ 349/155
(Continued)

FOREIGN PATENT DOCUMENTS

CN   1996133 A      7/2007
CN   101561591 A   10/2009
(Continued)

OTHER PUBLICATIONS

International Preliminary Report on Patentability datd May 13, 2014; PCT/CN2012/082707.
(Continued)

*Primary Examiner* — Huyen Ngo
(74) *Attorney, Agent, or Firm* — Ladas & Parry LLP

(57) ABSTRACT

According to embodiments of the invention, there are disclosed a liquid crystal display panel and a liquid crystal display device. The liquid crystal display panel comprises: a liquid crystal layer; a conductive structure, surrounding the liquid crystal layer; and a driving circuit, connected to the conductive structure. The driving circuit comprises: a power supply circuit and a switch circuit. The power supply is connected to the conductive structure and provides the conductive structure with a DC voltage. One terminal of the switch circuit is connected to the conductive structure and the other terminal thereof is grounded.

14 Claims, 2 Drawing Sheets

(51) Int. Cl.
*G02F 1/1362* (2006.01)
*G09G 3/36* (2006.01)

(52) U.S. Cl.
CPC .... *G09G 2300/0426* (2013.01); *G09G 2330/02* (2013.01)

(56) References Cited

U.S. PATENT DOCUMENTS

| | | | |
|---|---|---|---|
| 2005/0104835 A1* | 5/2005 | Misonou et al. | 345/96 |
| 2007/0279543 A1* | 12/2007 | Park et al. | 349/40 |
| 2008/0142819 A1 | 6/2008 | Liu et al. | |
| 2010/0225632 A1 | 9/2010 | Ma et al. | |
| 2011/0063549 A1 | 3/2011 | Eom | |
| 2013/0300995 A1* | 11/2013 | Nagami | 349/153 |

FOREIGN PATENT DOCUMENTS

| | | |
|---|---|---|
| CN | 101650499 A | 2/2010 |
| CN | 101819348 A | 9/2010 |
| CN | 101825817 A | 9/2010 |
| CN | 101846841 A | 9/2010 |
| CN | 102023408 A | 4/2011 |
| CN | 202281886 U | 6/2012 |

OTHER PUBLICATIONS

International Search Report mailed Jan. 17, 2013; PCT/CN2012/082707.

\* cited by examiner

LIQUID CRYSTAL DISPLAY PANEL COMPRISING CONDUCTIVE STRUCTURE AND LIQUID CRYSTAL DISPLAY DEVICE

TECHNICAL FIELD

Embodiments of the invention relate to a liquid crystal display panel and a liquid crystal display device.

BACKGROUND

Thin Film Transistor-Liquid Crystal Displays (TFT-LCDs) have been widely used in various electronic apparatuses with display function, such as Televisions (TVs), monitors, portable electronic devices, etc. Presently, manufacturers are making efforts to enhance properties of the TFT-LCDs so as to reduce power consumption, enlarge viewing angle and decrease response time. Among various efforts of enhancing properties of the TFT-LCDs, improvement to image sticking is essential because it directly affects the display quality.

The image sticking refers to a phenomenon that, when a certain still image is changed to other image after it has been displayed for a long time, profile of the image retains. Depending on forms and locations, the image sticking is classified into two types: an area image sticking and a line image sticking. Study on mechanism of the image sticking shows that the image sticking is mainly resulted from residual charges, and the residual charges comprise polarized charges that are generated inside a liquid crystal display panel under an external electric field and impurity charges inside the liquid crystal display panel. These residual charges affect orientations of liquid crystal molecules at the top and bottom portions of the liquid crystal display panel and results in the image sticking. Occurrence of the image sticking can severely affect the display effect of the liquid crystal display. Further, in a peripheral region of the liquid crystal display panel, liquid crystal molecules may contact with a sealant and be polluted, thus impurity ions may be easily generated, and the line image sticking may occur after the impurity ions gather to a certain degree. Therefore, the line image sticking mostly occurs in the peripheral region of the liquid crystal display.

SUMMARY

According to an aspect of the invention, there is provided a liquid crystal display panel. The liquid crystal display panel comprises: a liquid crystal layer; a conductive structure, surrounding the liquid crystal layer; and a driving circuit, connected to the conductive structure.

According to another aspect of the invention, there is provided a liquid crystal display device. The liquid crystal display device comprises the above-described liquid crystal display panel.

In the liquid crystal display panel and the liquid crystal display device according to the embodiments of the invention, voltage is applied to the edges of the panel by the driving circuit and the conductive structure, so that residual charges which otherwise gather inside the panel move toward the edges of the panel and are conducted out. Furthermore, as the applied voltage periodically alternates between a positive polarity and a negative polarity, it is possible that both of positive and negative charges move toward the edges of the panel and are conducted out. Consequently, residual charges inside the liquid crystal display panel can be decreased, and the image sticking can be eliminated. Moreover, the liquid crystal display panel and the liquid crystal display device according to the embodiments of the invention have simple structures and can be manufactured easily.

BRIEF DESCRIPTION OF THE DRAWINGS

To illustrate technical solutions in embodiments of the present invention more clearly, accompanied drawings of the embodiments will be briefly introduced below. Obviously, the accompanied drawings described below merely relate to some embodiments of the present invention, rather than a limitative of the present invention.

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

Compared to a liquid crystal display panel of vertical electric field mode, image sticking more likely occurs in a liquid crystal display panel of horizontal electric field mode. For example, in a FFS-type TFT-LCD of horizontal electric field mode, the horizontal electric field is generated by a pixel electrode and a common electrode that are provided on a TFT array substrate. Because distance between the pixel electrode and the common electrode is relatively small, the intensity of the horizontal electric field is larger than that of a vertical electric field. Thereby, polarized charges and impurity charges inside the liquid crystal display panel accumulate more easily under the horizontal electric field, and a parasitic electric field can be generated by these accumulated charges. When liquid crystal molecules are driven by voltage for a latter image, the liquid crystal molecules can not deflect completely due to existence of the parasitic electric field, thus profile of a former image retains and image sticking occurs.

Nevertheless, it should be noted that, embodiments of the invention not only can be applied to liquid crystal display panels of horizontal electric field mode, such as FFS type, IPS type and the like, but also can be applied to liquid crystal display panels of vertical electric field mode, such as VA type, MVA type and the like.

Hereinafter, a liquid crystal display panel according to an embodiment of the invention will be described in detail in combination with FIG. 1 to FIG. 4.

Figure 1:
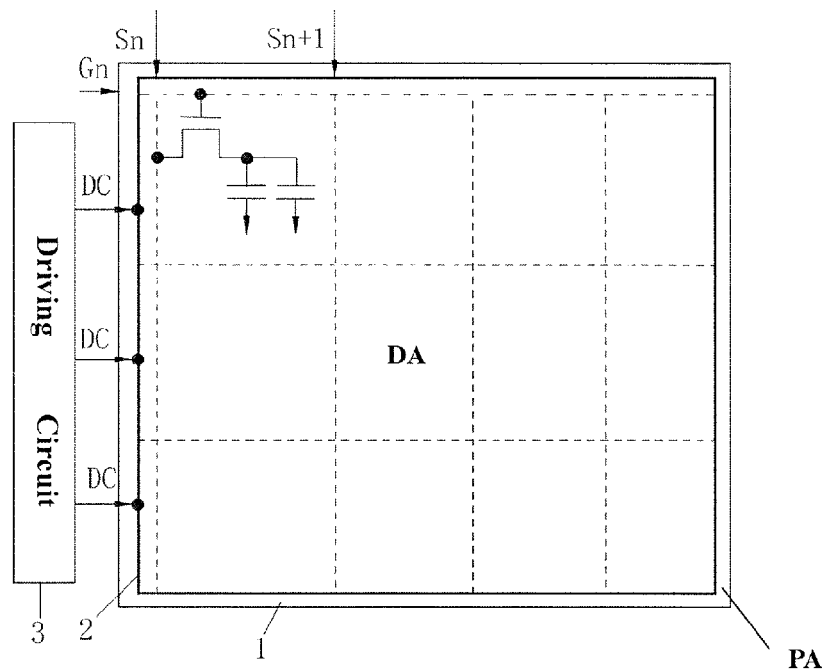
FIG. 1 is a structurally schematic view showing a liquid crystal display panel according to an embodiment of the invention.

FIG. 1 is a structurally schematic view showing the liquid crystal display panel according to the embodiment of the invention. As shown in FIG. 1, the liquid crystal display panel according to the embodiment of the invention comprises: a counter substrate (not shown), an array substrate 1, and a liquid crystal layer filled between the counter substrate and the array substrate 1. Furthermore, the liquid crystal display panel further comprises: a conductive structure 2 surrounding the liquid crystal layer and a driving circuit 3 connected to the conductive structure 2. An electric field parallel to the panel is generated by applying a voltage to the conductive structure 2 by the driving circuit 3. Then, residual charges inside the liquid crystal panel are absorbed by the electric filed, so that the residual charges, which otherwise gather within the liquid crystal panel, move toward the edges of the panel and are conducted out of the liquid crystal display panel. Thereby, image sticking can be prevented and display quality can be improved.

For example, the counter substrate (not shown) may be a color filter substrate or a glass substrate.

The array substrate 1 comprises a plurality of gate lines Gn and a plurality of data lines Sn, and these gate lines and data lines intersect with each other to thereby define a plurality of pixel units arranged in a matrix form. Each of the pixel units comprises a thin film transistor functioning as a switch element and a pixel electrode for controlling arrangement of liquid crystal molecules in the liquid crystal layer. For example, regarding the thin film transistor of each pixel, its gate electrode is electrically connected to or integrally formed with a corresponding gate line, its source electrode is electrically connected to or integrally formed with a corresponding data line, and its drain electrode is electrically connected to or integrally formed with the pixel electrode. Further, with respect to a horizontal electric field mode liquid crystal display panel (such as FFS type, IPS type liquid crystal display panel and the like), the array substrate 1 may further comprise a common electrode.

The liquid crystal display panel comprises a display region DA and a peripheral region PA outside the display region DA. The display region DA comprises the pixel units arranged in the matrix form and is used for image display. The peripheral region PA does not comprise any pixel unit and is not used for image display. For example, a sealant may be formed in the peripheral region PA and used for defining a space for the liquid crystal layer. In addition, the conductive structure 2, which surrounds the liquid crystal layer, may be located in the peripheral region PA. The conductive structure 2 may be formed as a closed structure. Alternatively, the conductive structure 2 may be formed as a non-closed structure, and merely disposed at several locations discontinuous with each other. For example, the conductive structure 2 may be merely disposed on upper and lower sides of the liquid crystal display panel, or may be merely disposed on left and right sides of the liquid crystal display panel.

Here, materials and methods for forming the conductive structure 2 are not limited, as long as the finally formed conductive structure has conductivity.

The conductive structure 2 may be disposed on the array substrate, on the counter substrate, or on both of the array substrate and the counter substrate. Preferably, the conductive structure 2 is disposed on the array substrate 1 and manufactured simultaneously with other conductive layer(s) on the array substrate, so as to simplify the manufacturing process. For example, the conductive structure 2 may be formed of metals, transparent conductive materials (such as ITO (Indium Tin Oxide)) and the like.

In addition, in an example, the conductive structure 2 may be a conductive sealant. The conductivity of the conductive sealant may be obtained by doping conductive particles in the sealant in a liquid crystal bonding process, or by directly fabricating the sealant with a conductive material. The conductive particles described above comprise at least one of Au balls and carbon fibers.

The driving circuit 3 may be fabricated separately, or may be fabricated simultaneously with a driving component such as a gate driver, a data driver and the like. For example, the driving circuit 3 may be disposed in the peripheral region PA as well.

Figure 2:
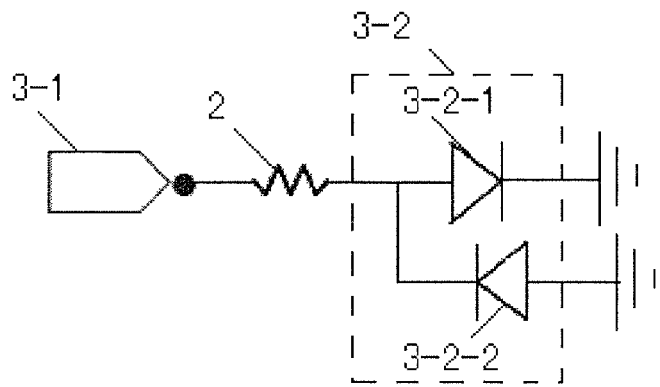
FIG. 2 is a structurally schematic view showing a driving circuit in the liquid crystal display panel according to the embodiment of the invention.
Figure 3:
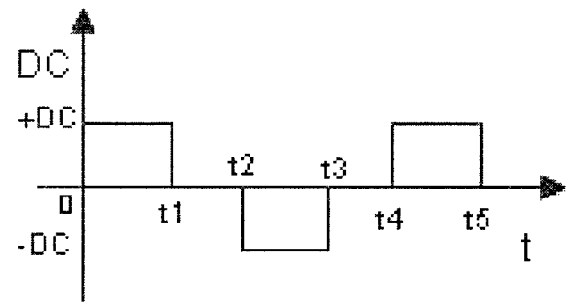
FIG. 3 is a schematic view showing a voltage applied on a conductive structure in the liquid crystal display panel according to the embodiment of the invention.

As shown in FIG. 2, the driving circuit 3 comprises a power supply circuit 3-1. The power supply circuit 3-1 is connected to the conductive structure 2 and provides the conductive structure 2 with a DC (direct current) voltage which periodically alternates between a positive polarity and a negative polarity (as shown in FIG. 3). Thereby, an electric field which periodically alternates between positive polarity and negative polarity is generated by the conductive structure 2, so that both of positive and negative residual charges can move toward the edges of the liquid crystal display panel. Furthermore, the driving circuit 3 further comprises a switch circuit 3-2. One terminal of the switch circuit 3-2 is connected to the conductive structure 2, and the other terminal thereof is grounded. The switch circuit 3-2 is turned-on or turned-off depending on the polarity of the voltage applied to the conductive structure 2, so that corresponding residual charges are conducted out.

Preferably, the switch circuit 3-2 may comprises: a first diode 3-2-1, a positive terminal thereof is connected to the conductive structure 2 and a negative terminal thereof is grounded; and a second diode 3-2-2, a negative terminal thereof is connected to the conductive structure 2 and a positive terminal thereof is grounded.

Figure 4:
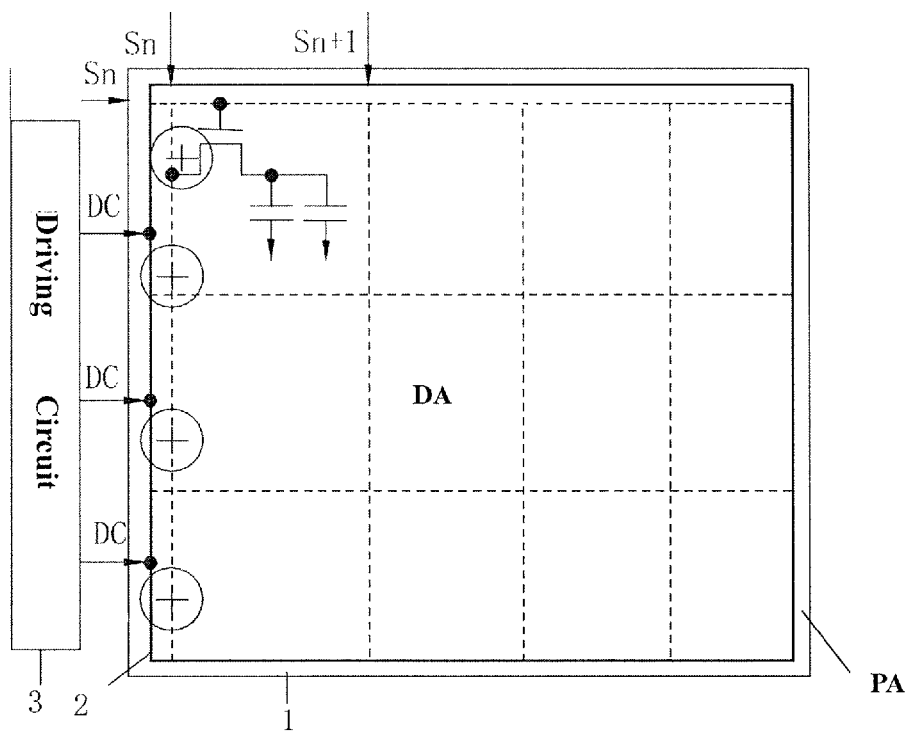
FIG. 4 is a schematic view showing the liquid crystal display panel according to the embodiment of the invention when a negative voltage is applied to the conductive structure.
Figure 5:
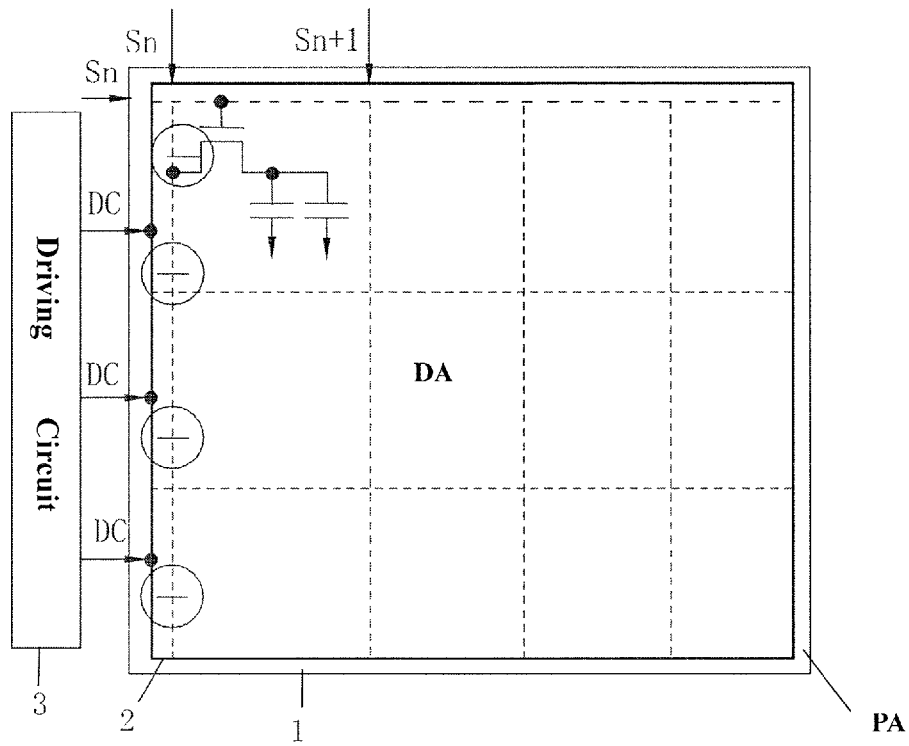
FIG. 5 is a schematic view showing the liquid crystal display panel according to the embodiment of the invention when a positive voltage is applied to the conductive structure.

As shown in FIG. 4, when a negative voltage is applied to the conductive structure 2, positive charges inside the liquid crystal display panel move toward the edges of the panel. After the positive charges accumulate to a certain degree, the first diode 3-2-1 connected to the conductive structure 2 is turned on, and the positive charges are conducted to the ground of a zero potential via the first diode 3-2-1. As shown in FIG. 5, when a positive voltage is applied to the conductive structure 2, negative charges inside the liquid crystal display panel move toward the edges of the panel. After the negative charges accumulate to a certain degree, the second diode 3-2-2 connected to the conductive structure 2 is turned on, and the negative charges are conducted to the ground of a zero potential via the second diode 3-2-2. Thereby, residual charges inside the liquid crystal display panel can be decreased, and adverse influence of the parasitic electric field on deflection of liquid crystal molecules can be reduced. Thus, image sticking can be eliminated.

According to an embodiment of the invention, there is further provided a liquid crystal display device comprising the above liquid crystal display panel. Other components (e.g. a backlight module) constituting the liquid crystal display device as known by those skilled in the art will not be described herein, and should not be construed as limiting of the device in the invention.

The above embodiments are merely used to explain the invention, but not limitative of the present invention. Various modifications and variations can be further made by those ordinarily skilled in the related technical field without departing from the spirit and scope of the present invention. Therefore, all of equivalent technical solutions also come within the scope of the present invention, and the patent protection scope of the present invention shall be defined by claims.

What is claimed is:
1. A liquid crystal display panel, comprising:
a liquid crystal layer;
a conductive structure, surrounding the liquid crystal layer; and
a driving circuit, connected to the conductive structure, wherein the driving circuit comprises:
a power supply circuit, connected to the conductive structure and providing the conductive structure with a DC voltage;
a switch circuit, one terminal thereof connected to the conductive structure and the other terminal thereof being grounded.

2. The liquid crystal display panel according to claim 1, wherein the power supply circuit provides the conductive structure with the DC voltage periodically alternating between a positive polarity and a negative polarity.

3. The liquid crystal display panel according to claim 1, wherein the switch circuit comprises:
a first diode, a positive terminal thereof is connected to the conductive structure and a negative terminal thereof is grounded; and
a second diode, a negative terminal thereof is connected to the conductive structure and a positive terminal thereof is grounded.

4. The liquid crystal display panel according to claim 1, wherein the liquid crystal display panel further comprises an array substrate and a counter substrate; and
wherein the conductive structure is disposed on the array substrate, on the counter substrate, or on both of the array substrate and the counter substrate.

5. The liquid crystal display panel according to claim 4, wherein the conductive structure is disposed on the array substrate.

6. The liquid crystal display panel according to claim 1, wherein the conductive structure is formed as a conductive sealant.

7. The liquid crystal display panel according to claim 6, wherein the conductive sealant is doped with conductive particles.

8. The liquid crystal display panel according to claim 7, wherein the conductive particles comprise at least one of Au balls and carbon fibers.

9. The liquid crystal display panel according to claim 6, wherein the conductive sealant is entirely formed of a conductive material, so that it has conductivity.

10. The liquid crystal display panel according to claim 1, wherein the liquid crystal display panel comprises a display region and a peripheral region outside the display region; and
wherein the conductive structure and/or the driving circuit are/is disposed in the peripheral region.

11. The liquid crystal display panel according to claim 1, wherein the conductive structure is formed as a closed structure.

12. The liquid crystal display panel according to claim 1, wherein the conductive structure is formed as a non-closed structure so as to comprise plural disconnected portions, and each of the portions is connected to the power supply circuit and the switch circuit.

13. The liquid crystal display panel according to claim 1, wherein the liquid crystal display panel is a horizontal electric field mode liquid crystal display panel.

14. A liquid crystal display device, comprising the liquid crystal display panel according to claim 1.

* * * * *